(12) United States Patent
Prager (10) Patent No.: US 7,275,065 B2
(45) Date of Patent: Sep. 25, 2007

(54) METHOD AND SYSTEM FOR SUPPORTING PER-USER-PER-ROW READ/UNREAD TRACKING FOR RELATIONAL DATABASES

(75) Inventor: Scott Prager, Stratham, NH (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 10/852,393

(22) Filed: May 24, 2004

(65) Prior Publication Data

US 2005/0262071 A1 Nov. 24, 2005

(51) Int. Cl.
G06F 17/30 (2006.01)
(52) U.S. Cl. .......................................... 707/102; 707/10
(58) Field of Classification Search .................. None
See application file for complete search history.

(56) References Cited

U.S. PATENT DOCUMENTS

| | | | |
|---|---|---|---|
| 5,819,272 A | 10/1998 | Benson | |
| 5,940,833 A | 8/1999 | Benson | |
| 5,940,835 A | 8/1999 | Sit | |
| 5,974,407 A | 10/1999 | Sacks | |
| 6,047,291 A | 4/2000 | Anderson | |
| 6,237,003 B1 | 5/2001 | Lewish | |
| 6,366,902 B1 | 4/2002 | Pultinas | |
| 6,396,833 B1 | 5/2002 | Zhang | |
| 6,571,231 B2 | 5/2003 | Sedlar | |
| 6,584,474 B1 | 6/2003 | Pereira | |
| 6,604,097 B2 | 8/2003 | Phoenix | |
| 2005/0209892 A1* | 9/2005 | Miller | 705/4 |
| 2006/0123010 A1* | 6/2006 | Landry et al. | 707/10 |

OTHER PUBLICATIONS

Yeong Hin Yuen et al., Integration of Tool Management Within A Data Driven Manufacturing System—Structured Analysis and Case Study, 1992, IEEE, pp. 356-364.*

Brenda Cammarano, Geographically distributed development with the IBM software development platform: a unified life cycle approach, Oct. 2004, www-03.ibm.com/solutions/plm/doc, pp. 1-20.*

* cited by examiner

*Primary Examiner*—Diane Mizrahi
(74) *Attorney, Agent, or Firm*—McGuinness & Manaras LLP (57) ABSTRACT

A system for tracking read/unread information in a relational database on a per-row, per user basis. Software hooks internal to the relational database, and that cover all access points of the relational database, ensure that tracking code is invoked for all accesses to the database. A tracking table tracks read/unread information on a per-user, per-row level. The internal software hooks are attached to database operations causing database reads. The tracking table may be exposed as part of the metadata for the database. The system may be embodied to track either table rows which have been read, or table rows that are unread. Database table rows may be tracked as read only when individually selected, or whenever they are part of a group of rows in a result set for a select operation. Compression of the tracking table may be accomplished using mechanisms for tracking sets of multiple rows.

20 Claims, 4 Drawing Sheets

FIG. 1

Columns 34

|  | 34a<br>User<br>I.D. | 34b<br>Database<br>Row I.D. | 34c<br>Timestamp<br>(Optional) | 34d<br>Other |
|---|---|---|---|---|
| 32a |  |  |  |  |
| 32b |  |  |  |  |
| 32c |  |  |  |  |
| 32d |  |  |  |  |
| 32e |  |  |  |  |
| 32f |  |  |  |  |

Rows 32

Tracking Table 30

METHOD AND SYSTEM FOR SUPPORTING PER-USER-PER-ROW READ/UNREAD TRACKING FOR RELATIONAL DATABASES

FIELD OF THE INVENTION

The present invention relates generally to database systems, and more specifically to a method and system for supporting per-user, per-row read/unread item tracking for relational databases.

BACKGROUND OF THE INVENTION

As it is generally known, in the technical area of computer systems, a database is a collection of information that is represented and stored electronically, and that is organized so that it can easily be accessed, managed, and updated using a computer program. Databases can be used to store any specific type of information. Database management system (DBMS) software is often used to enable a user or software process to enter, organize, and select data in a database. DBMS software provides the capabilities of controlling read/write access, specifying report generation, and analyzing usage. Databases and DBMS software are used in many specific types of computer systems, including large mainframe systems, as well as smaller, distributed workstation, mid-range, and personal computer systems.

SQL (Structured Query Language) is a standard language for specifying interactive database queries. Examples of existing database systems that may be accessed using SQL include IBM's DB2, Microsoft's Access, database products from Oracle, Sybase, and Computer Associates, and others.

Database technologies may be classified according to their approach to organizing the information they store. The most prevalent approach is the relational database, a tabular structure in which the stored data can be reorganized and accessed in various ways. Using a relational database, information may be linked together as required for a specific operation or application. In contrast, non-relational systems use links between portions of the stored information that are fixed, and/or embedded in the information itself.

Relational databases use tables (also referred to as files) to organize related information using rows and columns of the tables. Each row (also referred to as a record, document, or entry) in a table is a group of fields that are relevant to a specific entity. Each field within a row stores a separate piece of data. For example, a relational database for a business might contain a table for customer contact information, in which each row is associated with a customer, and each field contains data such as: customer account number, customer name, street address, city, telephone number and so on. A column within a table consists of all the values in a single field of the table, across all the rows of the table, such as all the telephone numbers of all the customers. Accordingly, in the customer contact information table example, the customers' account numbers, names, addresses, phone numbers, and so on, are stored as a series of columns in the table.

During operation of a relational database, relationships are created by comparing data field values, such as account numbers, names, etc. For example, through a command such as the SQL Join command, a relational database system has the flexibility to take any two or more tables and generate an output based on field values that meet a matching criteria. For example, a customer table and an order table can be used to process a query relating information in both files, such as a request for the names of customers that purchased a particular product.

Existing relational databases have a significant shortcoming, in that they do not provide a mechanism for tracking which table rows have been read, and which have not been read, by each particular user of the database. Software systems outside the area of relational databases, such as the Domino messaging and collaboration system provided by International Business Machines (IBM), have included mechanisms for tracking which documents have been read by individual users. However, such capabilities have as of yet not been available within relational database systems themselves.

Application specific solutions to this problem could be provided external to, or layered on top of underlying database systems. However, such an approach would be unacceptable for a number of reasons. First, consistent integration points would be difficult to implement. Second, application control would require application specific coding for every table. And third, the system could be bypassed at the database level, making it less than fully reliable.

Accordingly, there is a need for a new system that provides per-user, per-row read/unread tracking in a relational database system. The system should be convenient to implement, and not require excessive resources during operation. The new system should further provide consistent integration points, application control without re-coding for every table and application, and full reliability down through the database layer.

SUMMARY OF THE INVENTION

To address the above described and other shortcomings of existing systems, a new system for tracking read/unread information on a per-user, per-row level is disclosed using software hooks that are internal to a relational database. The software hooks cover all access points of the relational database, thus ensuring that tracking code is invoked for all accesses to the database, and that the new system cannot be bypassed by applications or users. A tracking table format is disclosed for tracking read/unread information on a per-user, per-row level.

Based on internal software hooks attached to database operations causing database reads, such as SQL Select operations, a list of either read or unread table rows is maintained through at least one tracking table. The disclosed system may use a variety of specific types of software hooks, operating at a sufficiently low level that they are consistently triggered, resulting in high reliability. Examples of software hook techniques that may be employed in this regard include what are generally referred to as triggers, as well as database-specific external extension mechanisms, referred to with terms such as "blades", "extensions", and others. In a embodiment in which the disclosed system is implemented internally within the relational database, the tracking table may be exposed as part of the metadata for the database.

The disclosed system may be embodied to track either database table rows which have been read, or database table rows that are unread. Rows may be tracked in the tracking table using various specific techniques, for example using internal identifiers such as table identifiers and row identifiers, or by using data-specific identifiers such as keys or names, or any other row-specific identifying technique. The tracking table contains a single row for every corresponding database table row that is either read or unread, depending on the specific embodiment, per user. Accordingly, in a given embodiment, the rows in the tracking table may be used to track either corresponding rows in the database tables that have been read, or that have not been read.

A "read" indication may be written to a tracking table row for a corresponding database table row when a corresponding database table row is selected. An "unread" indication may be written to a tracking table entry when a corresponding database table row is created or updated. Tracking table rows may be removed from the tracking table when the corresponding database table row is deleted. Such removal of tracking table rows may be done immediately in real-time, or later as part of a "batch" of row deletions, for example performed as a kind of synchronization operation between the tracking table and the database tables.

The disclosed system may be configured or embodied such that database table rows are tracked as read only when they are individually selected, for example when specifically selected by row identifier, or whenever they are part of a group of rows in a result set for a select operation. This allows tracking of a row based on any select access to the row, or based only on specific selections individually identifying that row.

The disclosed system may be extended to enable compression of a tracking table based on a various mechanisms for tracking groups of rows. For example, a series of database table rows whose row identifiers are consecutive could be tracked using a single tracking table row. Other compression methods may also be used to represent groups of rows with a single tracking table entry.

The read/unread data represented by the disclosed tracking table can be retrieved either explicitly or implicitly as part of a query. Current SQL capabilities allow for explicit access—by simply doing standard SQL joins between one or more data tables and the tracking table on a common key, and then filtering the result via the presence or absence of the row in the tracking table and a specific user-ID, to retrieve either read or unread rows only for the particular user. Alternatively, implicit usage is much simpler to use, and can be provided via a few methods, although it does require database system enhancements. Implicit usage allows the selection of only read or only unread rows for the current user without the need to refer to the tracking table, since the database system will automatically combine the tracking table into queries as relevant. Two possible methods for exposing implicit usage are providing new options in the database API, or providing new extensions to SQL. These methods allow the user to easily indicate whether read or unread rows are desired via simple keywords or calls.

The disclosed system leverages the high performance of relational database tables and table joins, and the consistency of hooking techniques such as relational database triggers to provide a more reliable, simpler and better performing solution than would otherwise be available.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
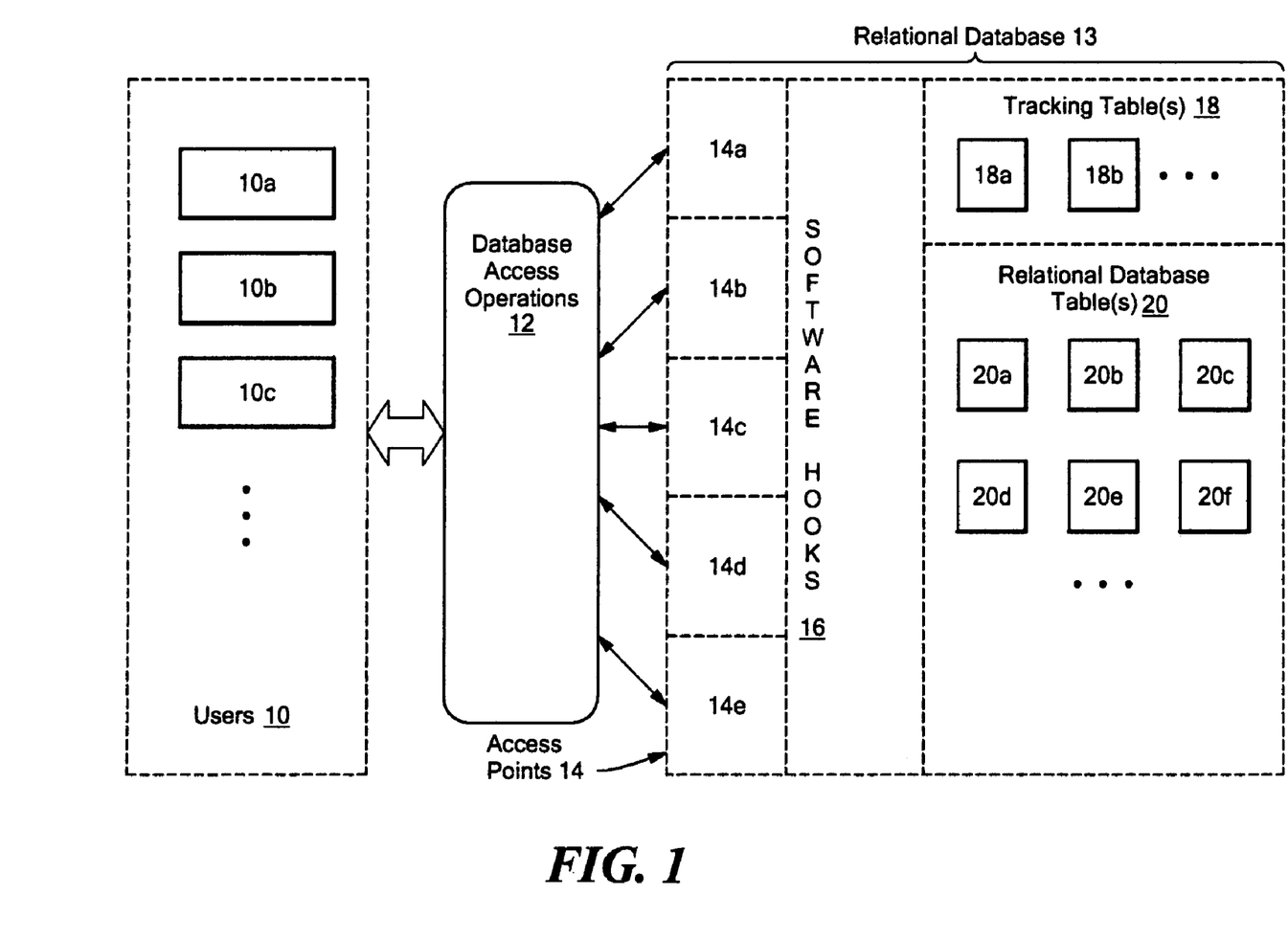
FIG. 1 is a block diagram showing an illustrative embodiment of the disclosed system.

As shown in the illustrative embodiment of FIG. 1, a number of users 10, including users 10a, 10b, and 10c, provide database access operations 12 to a number of database access points 14 of a relational database 13, shown including access points 14a, 14b, 14c, 14d and 14e. The users 10 may include any specific type of relational database user, including persons or computer programs. The database access operations 12 may, for example, include database queries specified using a query language such as SQL (System Query Language). Database operations defined as SQL operations include Select, Insert, Update, Delete, Join, and others. Other database access or query languages may alternatively be used in this regard, as well as stored procedures within the relational database 13, or an approach wholly or partly including API (Application Program Interface) accesses to the relational database 13.

The database access operations 12 are passed to database access points 14. The access points 14 may include one or more user interfaces provided, for example provided using a database management system (DBMS), and may employ one or more internal interfaces of the relational database 13. The database access operations 12 are processed such that those of the database access operations 12 indicating a read of one or more of the rows in the relational database tables 20 are intercepted by software hooks 16. For example, an SQL Select query, which results in a read of one or more of the rows in the relational database tables 20, would cause one of the software hooks 16 to be invoked.

The software hooks 16 may, for example, employ a new form of software "trigger" mechanism. In the disclosed system, one or more read triggers are executed when a read operation occurs against one or more of the relational database tables 20, such as an SQL Select operation against one or more of the tables 20, shown for example including tables 20a, 20b, 20c, 20d, 20e or 20f. The software triggers may be implemented as SQL procedures that are executed by a database management system (DBMS) whenever a row or rows in one or more of the relational database tables 20 is read. The database read triggers execute stored procedures including tracking software for maintaining one or more tracking tables 18, shown for example including tracking tables 18a, 18b, etc. The tracking tables 18 may, for example, be embodied within a collection of metadata for the relational database 13. The disclosed database read triggers may, for example, be built into a DBMS associated with the relational database 13.

Other specific types of software hooks 16 may be used, so long as they are provided within the relational database 13. The tracking software invoked by the software hooks 16 generates an indication of which rows in the relational database tables 20 have been read by which database users that is represented and maintained by the tracking tables 18.

Figure 2:
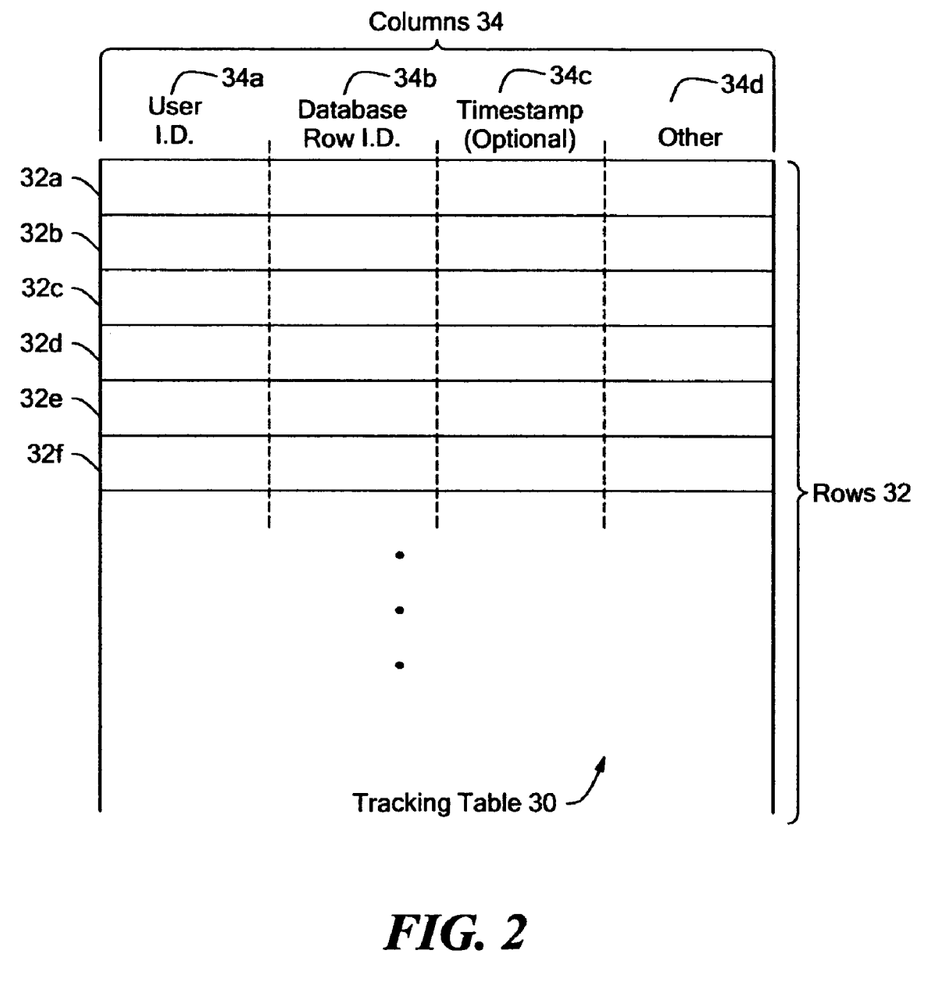
FIG. 2 shows an illustrative embodiment of the disclosed per-user, per-row, read operation tracking table for a relational database.

FIG. 2 shows an illustrative embodiment of the disclosed per-user, per-row, read operation tracking table 30 for the relational database 13 shown in FIG. 1. As shown in FIG. 2, the tracking table 30 includes a number of rows 32, shown for purposes of illustration including the rows 32a, 32b, 32c, 32d, 32e, 32f, etc. Each of the rows 32 of the tracking table 30 may be used to indicate a row or group of rows in the relational database tables 20 that have been read, or alternatively, one or more rows in the relational database tables 20 that have not been read. In the first case, each of the rows 32 in the tracking table 30 corresponds to a row in the relational database tables 20 that has been read by a specified user. In the latter case, each of the rows 32 in the tracking table 30 corresponds to a row in the relational database tables 20 that is unread by a specified user. The determination of which of these alternative approaches to use for a given application of the disclosed system may, for example, depend on the relative numbers of read and unread rows that are anticipated or encountered in practice. In the case where a row in the tracking table 30 represents a group of rows in the relational database, a column may be provided in the tracking table to store a value indicating the end of the represented range of database table rows for a tracking table row, for example using a database row identifier for the database table row at the end of the represented range.

As shown in FIG. 2, the columns 34 of the tracking table 30 define a number of illustrative fields for each of the rows 32. A user ID column 34a may be used to store an identifier of the database user associated with each row. The value of the fields in the user ID column 34a may be obtained by the tracking software through a user login process, or any other appropriate manner, and identifies a user or database accessing program. A database row ID 34b is used to store an identifier of a row in one of the tables of the relational database that is associated with each row. The value of the fields in the database row ID column 34b may include, for example, a table identifier and a row identifier that are internal to the database, or data-specific names or keys, such as Order Number, Customer Name, etc. Thus the value of the database row ID 34b field points to one or more database table rows associated with a given tracking table row.

An optional timestamp column 34c may be used to store a time when the row or rows in the relational database tables identified in column 34a was last read. Accordingly, a non-zero value in a column 34a field may be used to indicate a time at which the corresponding row in the relational database tables identified in column 34a was been read by the user identified in the field for column 34a. If the row in the relational database table identified in column 34a is updated or modified, the value of the time stamp field defined by column 34c could be set to zero, indicating that the new contents of the corresponding row in the relational database table identified in column 34b has not been read by the user indicated in the field defined by the column 34a. In this way, a non-zero value in the timestamp column 34c of a row in the tracking table 30 can be considered a read "mark" in that tracking table row, and thus used to mark corresponding rows within the tables of the relational database as read. Similarly, a zero value in the timestamp column 34c of a row in the tracking table 30 can be considered an "unread" mark in that tracking table row, and thus used to used to mark corresponding rows of the relational database as unread.

Another technique that may be used in the disclosed system involves removing tracking table rows when the rows in the relational database tables that they point to are updated or modified. When a read operation subsequently occurs, the tracking table rows are added to the tracking table with identifiers of the rows that were read and the users that performed the reads. Other columns 34d may also be included in the tracking table 30 as necessary to support a particular application or embodiment.

Figure 3:
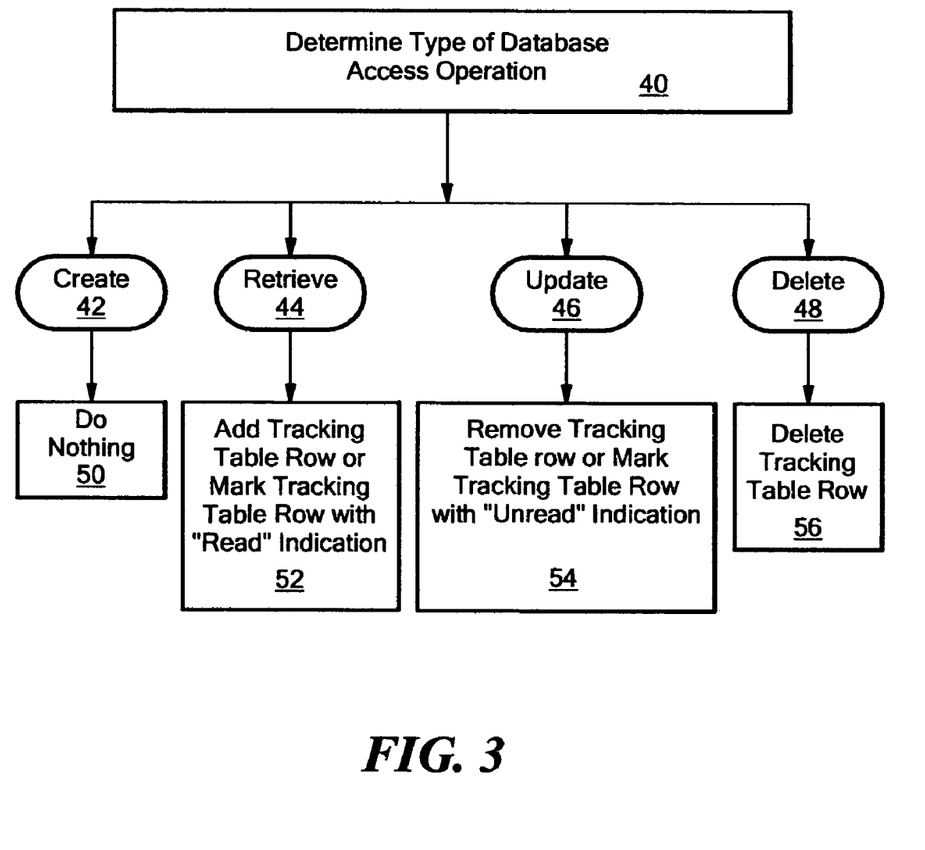
FIG. 3 is a flow chart showing steps performed in an illustrative embodiment of the disclosed system where tracking table rows correspond to database table rows that have been read.

FIG. 3 is a flow chart showing steps performed in an illustrative embodiment of the disclosed system in which tracking table rows are at least initially added to represent rows in the database tables that have been read. At step 40, the disclosed system receives a database access operation, and determines the type of the database access operation. In the case of a create operation 42, the embodiment of FIG. 3 does nothing at step 50. In the case of a retrieve operation 44, at step 52 the disclosed system may add one or more rows to the tracking table corresponding to a row or rows that were read through the detected read operation, and indicating the identity of the user that issued the retrieve operation 44. Alternatively, if one or more tracking table rows corresponding to the read row or rows is already present in the tracking table, the disclosed system may operate to mark each such tracking table row with a "read" indication at step 52.

In the case of an update operation 46, the embodiment of the disclosed system shown in FIG. 3 may operate at step 54 to remove one or more tracking table rows corresponding to the database table rows that are modified as a result of the update operation 46. Alternatively, the embodiment of the disclosed system shown in FIG. 3 may operate at step 54 to mark one or more tracking table rows modified as a result of the update operation 46 to include an "unread" indication. In the case of a delete operation 48, the embodiment of the disclosed system shown in FIG. 3 operates at step 56 to delete those rows in the tracking table corresponding to the database table rows that are deleted.

Figure 4:
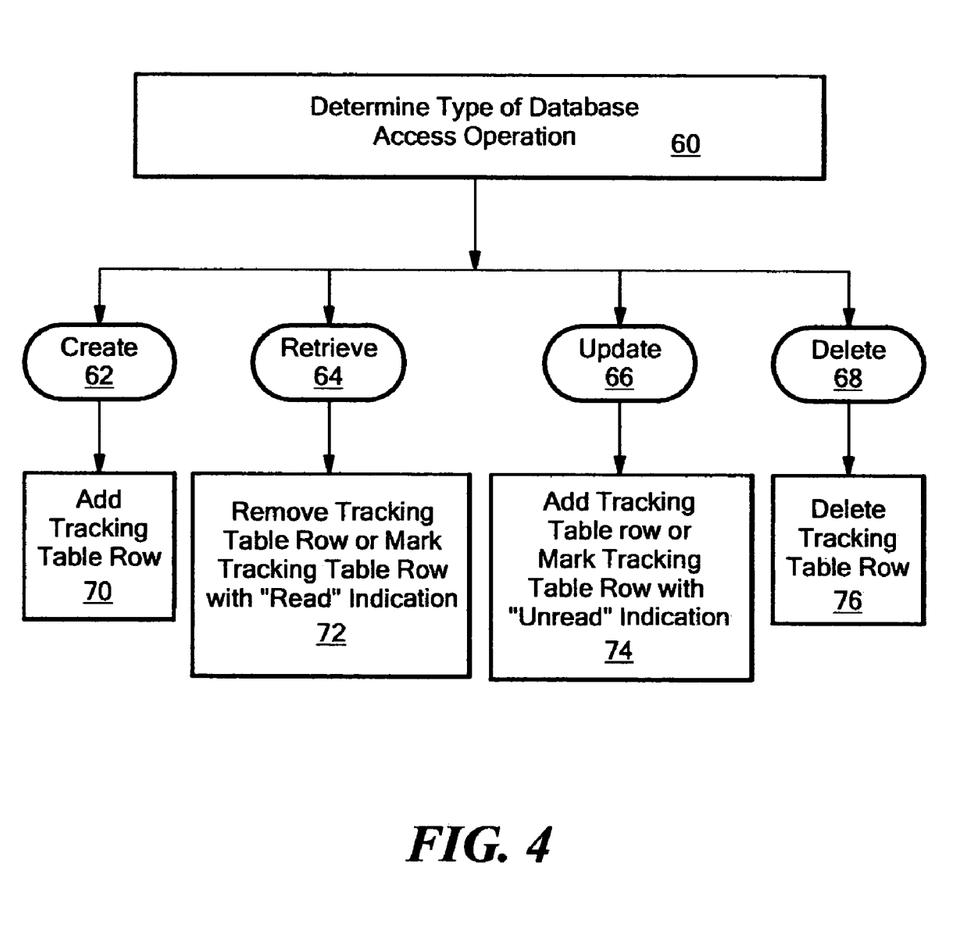
FIG. 4 is a flow chart showing steps performed in an illustrative embodiment of the disclosed system where tracking table rows correspond to database table rows that are unread.

FIG. 4 is a flow chart showing steps performed in an illustrative embodiment of the disclosed system in which tracking table rows are at least initially added to represent rows in the database tables that are unread. At step 60, the disclosed system receives a database access operation, and determines the type of the database access operation. In the case of a create operation 62, at step 70 the embodiment of FIG. 4 adds one or more tracking table rows corresponding to the database rows that were added as a result of the create operation 62. In the case of a retrieve operation 64, at step 72 the disclosed system may remove one or more rows from the tracking table corresponding to a row or rows that were read through the detected read operation, and where the removed rows indicated the identity of the user that issued the retrieve operation 64. Alternatively, the disclosed system may operate to mark each such existing tracking table row with a "read" indication at step 72.

In the case of an update operation 66, the embodiment of the disclosed system shown in FIG. 4 may operate at step 74 to add one or more tracking table rows corresponding to the database table rows that are modified as a result of the update operation 66. Alternatively, the embodiment of the disclosed system shown in FIG. 4 may operate at step 74 to mark one or more tracking table rows modified as a result of the update operation 66 to include an "unread" indication. In the case of a delete operation 68, the embodiment of the disclosed system shown in FIG. 4 operates at step 76 to delete those rows in the tracking table corresponding to the database table rows that are deleted.

In this way, and as described in the above embodiments, the disclosed system operates to detect database access operations involving a read of at least one row of a table within the relational database. If the received database access operation involves a read, then the disclosed system triggers tracking software that will record a representation or indication of each database table row that is read as a result of the operation, as well as a representation or indication of the user that issued the access operation. The tracking software of the disclosed system may accordingly use the tracking table to indicate rows in the relational database tables that were read as a result of the received database access operation as read, and to record an identifier of the user that issued the operation in association with each read row. Accordingly, rows in the relational database tables may be indicated as read when they are selected through an SQL Select query, and indicated as unread when they are initially created or updated. Specific rows in the tracking table may be deleted from the tracking table when the relational database row or rows they correspond to are deleted.

The disclosed system may be embodied to either indicate relational database table rows as read only when they are selected specifically, or whenever they are selected. For example, relational databases allow for the production of large result sets, but often only parts of these result sets are actually viewed by a user. Accordingly, the disclosed system may be embodied to include the ability to indicate at creation time whether to track any select access to a row in the relational database tables, or only specific select accesses to a row occur. For example, a specific access to a row in the relational database tables may be considered to occur when it is specifically selected by a user through its row ID or data key values.

An extension of the disclosed system enables compression of the tracking table based tracking sets of rows together. For example, a series of rows in the relational database tables whose identifiers are consecutive could be tracked as a single unit. Thus the set of multiple relational database table rows might be represented using a single tracking table row. For example, all relational database tracking rows indicated by last names between "Smith" and "Stewart" could be tracked with a single tracking table entry. Other compression methods could also be used to represent groups of records with a single entry.

In one embodiment, the disclosed system is implemented internally within a relational database, and the tracking table exposed as part of the metadata for the database. The disclosed system may be implemented in any way that is at a sufficiently low level that relevant database operations are always triggered. Additionally, database-specific extension mechanisms may be used to implement the disclosed functions, such as those sometimes referred to with terms such as "blades", "extensions" or other terms.

The disclosed system provides many advantages over previous systems. With the information maintained in the disclosed tracking table, users can choose to access only information that they have not previously viewed. Similarly, information can be displayed to a user in a way that indicates which information has previously been viewed, and which has not. Further, modifications to previously read information can be tracked user by user basis using the disclosed system. For example, the disclosed tracking table can be used as part of a Join database query in order to exclude all rows in the relational database tables that either do or do not match specified user identifier and/or timestamp criteria.

Moreover, while certain trigger type mechanisms may have previously been provided for intercepting database operations such as SQL Insert, Update, and Delete, previous systems have not included read triggers that may be used for SQL Select operations. Advantageously, in the disclosed system, triggers for database queries such as Select operations are provided to generate and maintain the information in the tracking table.

FIG. 1 is a block diagram, and FIGS. 3 and 4 are flowchart illustrations of methods, apparatus (systems) and computer program products according to an embodiment of the invention. It will be understood that each block of FIGS. 1, 3, and 4, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the system may be embodied using a variety of specific command structures. Accordingly, the invention should not be viewed as limited except by the scope and spirit of the appended claims.

I claim:

1. A computer system including a computer readable storage medium, said computer readable storage medium having computer program code stored thereon, which when executed would cause said computer system to track read operations in a relational database, said program code comprising:

at least one hook associated with each access point to said relational database, wherein said hook detects each database query of at least one predetermined query type, wherein said database query results in a read of at least one row of a table of said relational database;

at least one tracking procedure, responsive to said at least one hook, wherein said tracking procedure determines an identifier of a user that issued said detected database query and determines an identifier of said at least one row of said table in said relational database;

a tracking table, responsive to said tracking procedure, for representing which rows in said relational database have been read by which users of said relational database; and wherein said tracking procedure creates resulting indications in said tracking table, said resulting indications representing which rows in said relational database have been read by which users of said relational database.

2. The computer system of claim 1, wherein said tracking table includes a plurality of rows, each of said tracking table rows representing a row in a table of said relational database that has previously been read, and each tracking table row including a user identifier field and a table row identifier, and wherein said tracking procedure stores said identifier of said at least one row of said table in said relational database and said identifier of said user that issued said detected database query in one of said plurality of rows in said tracking table.

3. The computer system of claim 1, wherein said tracking table includes a plurality of rows, each one of said tracking table rows representing a row in said relational database that has not been read, and wherein said tracking procedure removes a tracking table row corresponding to said identifier of said at least one row of said table in said relational database and said identifier of said user that issued said detected database query.

4. The computer system of claim 1, wherein said at least one predetermined query type comprises a system query language select operation.

5. The computer system of claim 2, wherein said tracking procedure stores said identifier of said at least one row of said table in said relational database and said identifier of said user that issued said detected database query in said tracking table only in the event that said detected database query comprises a specific request for said row within said table of said relational database.

6. The computer system of claim 2, wherein said tracking procedure stores said identifier of said at least one row of said table in said relational database and said identifier of said user that issued said detected database query in said tracking table in the event that said detected database query comprises a request resulting in said row within said table of said relational database being included in a result set.

7. The computer system of claim 1, wherein said at least one hook comprises a relational database trigger associated with said at least one predetermined query type.

8. The computer system of claim 1, wherein said tracking table includes a plurality of rows, wherein each of said tracking table rows corresponds to a plurality of database table rows.

9. The computer system of claim 1, wherein said hook detects query operations resulting in database rows being created, and detects query operations resulting in database rows being updated, and wherein said tracking procedure provides, responsive to said hook, indication in said tracking table that at least one database row is unread in response to detection of said query operations resulting in database rows being created and to detection of said query operations resulting in database rows being updated.

10. A method for tracking read operations in a relational database, comprising:
   associating at least one hook with each access point to said relational database;
   detecting, by said hook, each database query of at least one predetermined query type, wherein said database query results in a read of at least one row of a table of said relational database;
   determining, by a tracking procedure responsive to said at least one hook, an identifier of a user that issued said detected database query, and an identifier of said at least one row of said table in said relational database;
   representing, in a tracking table responsive to said tracking procedure, which rows in said relational database have been read by which users of said relational database; and
   creating, by said tracking procedure, resulting indications in said tracking table, said resulting indications representing which rows in said relational database have been read by which users of said relational database.

11. The method of claim 10, wherein said tracking table includes a plurality of rows, each of said tracking table rows representing a row in a table of said relational database that has previously been read, and each tracking table row including a user identifier field and a table row identifier, and further comprising storing, by said tracking procedure, said identifier of said at least one row of said table in said relational database and said identifier of said user that issued said detected database query in one of said plurality of rows in said tracking table.

12. The method of claim 10, wherein said tracking table includes a plurality of rows, each one of said tracking table rows representing a row in said relational database that has not been read, and further comprising removing, by said tracking procedure, a tracking table row corresponding to said identifier of said at least one row of said table in said relational database and said identifier of said user that issued said detected database query.

13. The method of claim 10, wherein said at least one predetermined query type comprises a system query language select operation.

14. The method of claim 11, further comprising storing, by said tracking procedure, said identifier of said at least one row of said table in said relational database and said identifier of said user that issued said detected database query in said tracking table only in the event that said detected database query comprises a specific request for said row within said table of said relational database.

15. The method of claim 11, further comprising storing, by said tracking procedure, said identifier of said at least one row of said table in said relational database and said identifier of said user that issued said detected database query in said tracking table in the event that said detected database query comprises a request resulting in said row within said table of said relational database being included in a result set.

16. The method of claim 10, wherein said at least one hook comprises a relational database trigger associated with said at least one predetermined query type.

17. The method of claim 10, wherein said tracking table includes a plurality of rows, wherein each of said tracking table rows corresponds to a plurality of database table rows.

18. The method of claim 10, further comprising detecting, by said hook, query operations resulting in database rows being created, and query operations resulting in database rows being updated, and providing, by said tracking procedure responsive to said hook, indication in said tracking table that at least one database row is unread in response to detection of said query operations resulting in database rows being created and to detection of said query operations resulting in database rows being updated.

19. A system for tracking read operations in a relational database, comprising:
   a computer memory;

means for associating at least one hook with each access point to said relational database;

means for detecting, by said hook, each database query of at least one predetermined query type, wherein said database query results in a read of at least one row of a table of said relational database;

means for determining, by a tracking procedure responsive to said at least one hook, an identifier of a user that issued said detected database query, and an identifier of said at least one row of said table in said relational database;

means for representing, in a tracking table responsive to said tracking procedure, which rows in said relational database have been read by which users of said relational database; and means for creating, by said tracking procedure, resulting indications in said tracking table, said resulting indications representing which rows in said relational database have been read by which users of said relational database.

20. A computer program product, wherein said computer program product includes a computer readable storage medium, said computer readable storage medium having computer program code recorded thereon for tracking read operations in a relational database, comprising:

code stored on said computer readable storage medium which, when executed, would cause a computer system to:

associate at least one hook with each access point to said relational database;

detect, by execution of said hook, each database query of at least one predetermined query type, wherein said database query results in a read of at least one row of a table of said relational database;

determine, by execution of a tracking procedure responsive to said at least one hook, an identifier of a user that issued said detected database query, and an identifier of said at least one row of said table in said relational database; and create, by execution of said tracking procedure, resulting indications in a tracking table, said resulting indications representing which rows in said relational database have been read by which users of said relational database.

* * * * *